United States Patent
Simo et al.

(10) Patent No.: US 10,528,982 B2
(45) Date of Patent: Jan. 7, 2020

(54) DETERMINING A PROMPT FOR PERFORMING AN ACTION PRESENTED TO A USER IN ASSOCIATION WITH VIDEO DATA

(71) Applicant: Facebook, Inc., Menlo Park, CA (US)

(72) Inventors: Fidji Nahema Simo, Palo Alto, CA (US); Asad K. Awan, San Francisco, CA (US); David Tin Ho Shih, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 616 days.

(21) Appl. No.: 14/485,528

(22) Filed: Sep. 12, 2014

(65) Prior Publication Data
US 2016/0078488 A1   Mar. 17, 2016

(51) Int. Cl.
*G06Q 30/00* (2012.01)
*G06Q 30/02* (2012.01)

(52) U.S. Cl.
CPC ............... *G06Q 30/0269* (2013.01)

(58) Field of Classification Search
CPC .................................. G06Q 30/0269
USPC ...................................... 705/14.66
See application file for complete search history.

(56) References Cited

U.S. PATENT DOCUMENTS 8,954,346 B1 * 2/2015 Walker ............... H04N 21/435
                                                     386/249
9,460,451 B2 * 10/2016 Ruiz ..................... G06Q 30/00
2004/0010806 A1   1/2004 Yuen et al.
2008/0281685 A1  11/2008 Jaffe et al.
2008/0300983 A1  12/2008 Chen et al.
2009/0006375 A1 *  1/2009 Lax ..................... G06Q 30/02
2011/0177773 A1   7/2011 Rao
2014/0136347 A1   5/2014 Lerman et al.

FOREIGN PATENT DOCUMENTS

JP   2002-207925 A   7/2002
JP   2008-040622 A   2/2008
JP   2012-524348 A  10/2012

OTHER PUBLICATIONS

PCT International Search Report and Opinion, PCT Application No. PCT/US2015/047831, dated Dec. 9, 2015, ten pages.
(Continued)

*Primary Examiner* — Azam A Ansari
(74) *Attorney, Agent, or Firm* — Fenwick & West LLP (57) ABSTRACT

An online system provides an advertisement ("ad") request including ad content and a prompt to perform an action presented in association with the ad content. For example, the ad content is video data and the prompt for performing an action is presented after the video data is presented or after a portion of the video data is presented. An advertiser may include a custom prompt in the ad request that includes text information and instructions associated with the text information that perform an action when executed. Multiple prompts may be included in the ad request, and the online system selects a prompt based on information maintained by the online system and associated with a user to be presented with the ad content. The selected prompt is communicated to a client device for presentation in association with the ad content.

16 Claims, 3 Drawing Sheets

(56) References Cited

OTHER PUBLICATIONS

Canadian Intellectual Property Office, Office Action, Canadian Patent Application No. 2,959,623, dated Nov. 10, 2017, five pages.
Japan Patent Office, Office Action, Japanese Patent Appl. No. 2017-513800, dated Apr. 23, 2019, five pages.

* cited by examiner

DETERMINING A PROMPT FOR PERFORMING AN ACTION PRESENTED TO A USER IN ASSOCIATION WITH VIDEO DATA

BACKGROUND

This disclosure relates generally to presentation of content by an online system, and more specifically to determining a prompt to perform an action presented to an online system user along with video content.

An online system, such as a social networking system, allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, an online system provides an ideal forum for entities, such as retailers or service providers, to increase awareness about products or services by presenting content to online system users.

Presenting content items to online system users allows an entity (e.g., a retailer, a service provider, a restaurant) to gain public attention for products or services or to persuade online users to take an action regarding the entity's products or services. Additionally, many online systems generate revenue by receiving compensation from entities for presenting certain content items to their users. Frequently, online systems charge an entity for each presentation of certain types of content items to an online system user (e.g., each "impression" of the content item) or for each interaction with certain types of content items by an online system user.

To provide additional information about products or services, an entity may include video data in a content item to be presented by an online system. Frequently, a prompt to perform an action is presented along with the video data to provoke a user viewing the video data to perform the prompted action. For example, a prompt to retrieve additional information about a product described by the video data is presented along with the video data. Conventionally, an entity specifies a prompt to perform an action when generating the content item including the video data, so the same prompt is presented to each user presented with the video data. However, different users may have different likelihoods of performing different types of actions, so users unlikely to perform the action identified by the prompt presented with the video data, but likely to perform a different type of action based on the video data, will not perform the action identified by the prompt.

SUMMARY

An online system receives an advertisement ("ad") request including targeting criteria, ad content, and one or more prompts for performing actions from an advertiser. The ad content includes video data, while a prompt for performing an action includes information identifying an action and instructions that, when executed, perform the identified action. For example, a prompt for performing an action is associated with a network address and an instruction to retrieve content from the network address if an input selecting the prompt is received.

Based at least in part on the targeting criteria included in the ad request, the online system identifies a user of the online system eligible to be presented with the ad content from the ad request. The identified user is associated with at least a threshold number of characteristics that satisfy the targeting criteria included in the ad request. When selecting content for presentation to the identified user, the ad request is included in a selection process in which one or more content items are selected for presentation to the identified user. In various embodiments, a bid amount included in the ad request is used by the online system in the selection process when determining whether to present the ad content included in the ad request to the identified user.

If the ad request is selected for presentation to the user, the online system retrieves information associated with the user and maintained by the online system. For example, the retrieved information includes demographic information associated with the user, actions performed by the user and stored by the online system, additional users connected to the user via the online system, content items previously presented to the user via the online system, and a location associated with the user. Based on the information associated with the user, the online system selects a prompt for performing an action from the one or more prompts included in the ad request. For example, the online system identifies a set of prompts for performing actions from the one or more prompts for performing actions included in the ad request and determines a relevance score between each prompt in the set and the user based on the retrieved information associated with the user. In one embodiment, the relevance score between a prompt and the user is based on a number of actions associated with the user matching or similar to the action associated with the prompt, so prompts associated with an action that the user has more frequently performed have higher relevance scores. Additional information associated with the user, as well as characteristics associated with the video data included in the ad request may also be used when determining relevance scores. For example, topics associated with the video data are compared to interests associated with the user, and actions performed by the user and associated with interests matching a topic associated with the video are compared to actions associated with prompts to perform actions in the ad request to determine relevance scores. In some embodiments, different characteristics are associated with different portions of the video data, and different prompts for performing actions are selected for presentation with different portions of the video data based on characteristics associated with portions of the video data and the retrieved information associated with the user.

The online system communicates the ad content to a client device for presentation to the user so the selected prompt for performing an action is presented in association with the video data. In one embodiment, the selected prompt for performing an action is presented after the video data included in the ad content has been presented. Alternatively, the selected prompt for performing an action is presented after a portion of the video data has been presented. Further, different prompts for performing an action may be presented after different portions of the video data have been presented.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
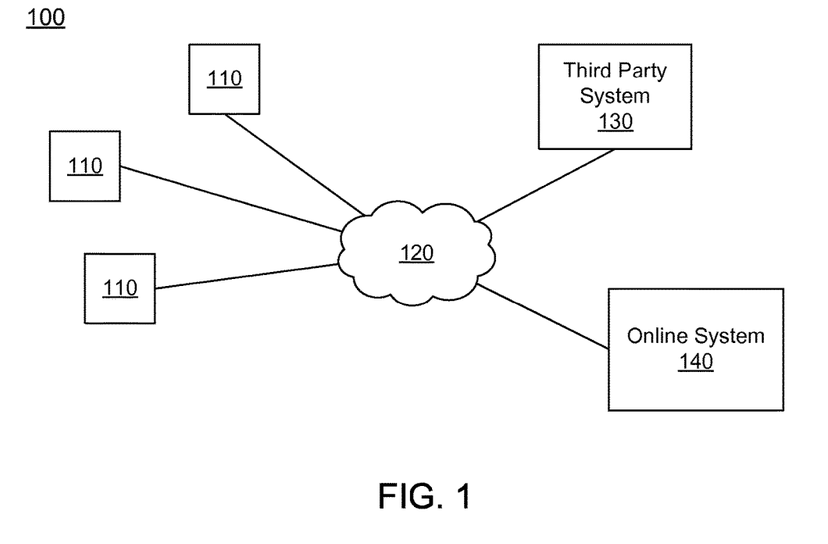
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems as well.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
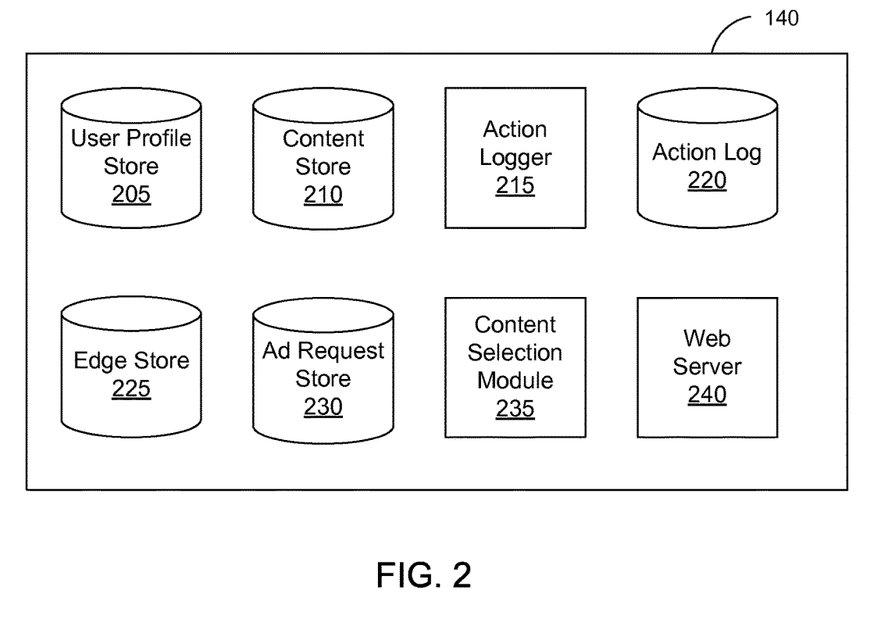
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture. In one embodiment, the online system 140 is a social networking system.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement ("ad") requests are included in the ad store 230. An ad request is received from an advertiser for presentation to users of the online system 140 and the ad request may be included in an advertisement campaign ("ad campaign") by the advertiser. Each ad request includes advertisement content ("ad content"), which is ad content presented to an online system user. Ad content may be text data, image data, audio data, video data, or any other suitable data. Additionally, ad content may include a link or destination address associated with a source of content associated with the ad request that is presented to the user if the user accesses the ad content when it is presented. For example, the destination address identifies a landing page including content that is presented to the user when the user accesses the ad content.

Additionally, an ad request include a bid amount specifying an amount of compensation an advertiser associated with the ad request provides the online system 140 for presenting the ad content, for a user interacting with presented ad content, or for another suitable interaction with presented ad content by a user. Based on the bid amount included in an ad request, the online system 140 determines an expected value for presenting ad content in the ad request to a user. For example, the expected value is an amount of monetary compensation received by the online system 140 from an advertiser for presenting the advertisement to a user, for a user interacting with the presented ad content, or based on any other suitable condition. In one embodiment, the expected value of an ad request is a product of the bid amount and a probability of the ad content of the ad request being accessed by the user if presented.

A bid amount associated with an ad request may be based on a type associated with the ad request. The type associated with an ad request may be based at least in part on the format with which ad content included in the ad request is displayed or the type of information presented by the ad content. For example, a type of ad request includes ad content describing a single product or service. Another type of ad request includes ad content describing multiple products or services. Another type of ad request may include multiple components of ad content and an order in which the various components are presented to a user. As another example, an ad request may include one or more prompts for performing an action that are presented along with ad content, such as video data, to encourage to perform actions identified by the one or more prompts; a prompt for performing an action includes information identifying an action and instructions that, when executed, perform the identified action. A bid amount associated with an ad request may be proportional to the amount of different content included in the ad content. For example, a higher bid amount is associated with an ad request including ad content describing multiple products or services than is associated with an ad request including ad content describing a single product or service.

Additionally, ad requests may be associated with one or more targeting criteria. An advertiser may specify targeting criteria associated with an ad request or may specify targeting criteria associated with multiple ad requests included in an ad campaign. Targeting criteria specify one or more characteristics of users eligible to be presented with an ad content included in an ad request associated with the targeting criteria. Associating different targeting criteria with different ad requests allows an advertiser to tailor presentation of ad content to users having specific characteristics, allowing ad requests including different ad content to be presented to users with different characteristics. For example targeting criteria specify demographic information, connections, or actions associated with a user. In some embodiments, targeting criteria may be associated with an ad campaign in its entirety, so multiple ad requests in the ad campaign are associated with the targeting criteria.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with ad content from various ad requests. As another example, targeting criteria identifies users having a connection to another user or object or having a particular type of connection to another user or object.

Additionally, an ad request may include an objective specifying a goal of the advertiser for presentation of the ad content in the ad request to online system users. The objective may also be associated with an ad campaign including the ad request to specify a goal of the advertiser for other ad requests in the ad campaign as well as the ad request. For example, the objective identifies a type of interaction with ad content from ad requests included in the ad campaign or with one or more objects associated with ad requests in the ad campaign by online system users presented with ad content from the ad campaign. Examples of objectives include: online system users accessing presented ad content (e.g., clicking or otherwise accessing the advertisement), online system users installing an application associated with the ad content, online system users expressing a preference for a page associated with the ad content (i.e., "liking" the page), online system users viewing a page associated with the ad content or with the ad campaign, or any other suitable action by online system users. In one embodiment, the objective is selected from a set of objectives maintained by the online system 140.

Additional information may be associated with an ad request or with the ad campaign including the ad request. For example, the ad request or ad campaign includes a budget that specifies a total amount of compensation an advertiser provides the online system 140 for presenting ad content included in the ad request or included in ad requests associated with an ad campaign. The budget may be allocated for the ad campaign as a whole or per ad request. In addition, the advertiser may specify instructions for allocating the budget among various ad requests in the ad campaign. For example, the instructions specify modification of a bid amount associated with an ad request included in the ad campaign based on one or more criteria. The instructions may also include other suitable information describing allocation of a budget among ad requests included in the ad campaign.

The content selection module 235 selects one or more content items for communication to a client device 110 to be presented to a user. In various embodiments, the content selection module 235 determines a measure of relevance of various content items to the user based on characteristics associated with the user by the online system 140 based on the user's affinity for different content items and selects content items for presentation to the user based on the determined measures of relevance. For example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad content. When selecting ad content, the content selection module 235 uses bid amounts associated with various ad requests. In various embodiments, the content selection module 235 determines an expected value associated with various ad requests and selects ad requests associated with a maximum expected value or at least a threshold expected value for presentation. An expected value associated with an ad request represents an expected amount of compensation to the online system 140 for presenting ad content from the ad request. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 may rank both content items and ad requests in a unified ranking based on bid amounts associated with ad request and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

If an ad request including one or more prompts for performing an action as well as ad content, such as video data, the content selection module 235 may select one or more prompts for performing an action that are presented along with the ad content. For example, a prompt for performing an action is presented in conjunction with one or more frames of video data included in the ad content. In other examples, the prompt for performing an action is presented at the completion of a portion of the video data, at the beginning of a portion of the video data, at the beginning of the video data, or at the end of the video data. The content selection module 235 may analyze frames of the video data to identify one or more objects included in various portions of the video data and select one or more prompts for performing an action presented in conjunction with a portion of the video data based at least in part on the object. As further described below in conjunction with FIG. 3, the content selection module 235 retrieves information associated with the user from one or more of the user profile store 205, the action log 220, and the edge store 225. Based on the retrieved information, the content selection module 235 selects a prompt for performing an action that is presented in association with the ad content. For example, the content selection module 235 determines relevance scores between the user and various actions associated with prompts for performing actions based at least in part on actions associated with the user by the online system 140 (e.g., actions stored in the action log 220 and associated with the user). Additional information, such as characteristics of the ad content may also be used when determining the relevance scores. For example, topics associated with the ad content are compared to interests associated with the user, with topics matching one or more interests used by the content selection module 235 when determining relevance scores. Selection of a prompt for performing an action that is presented in association with ad content is further described below in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
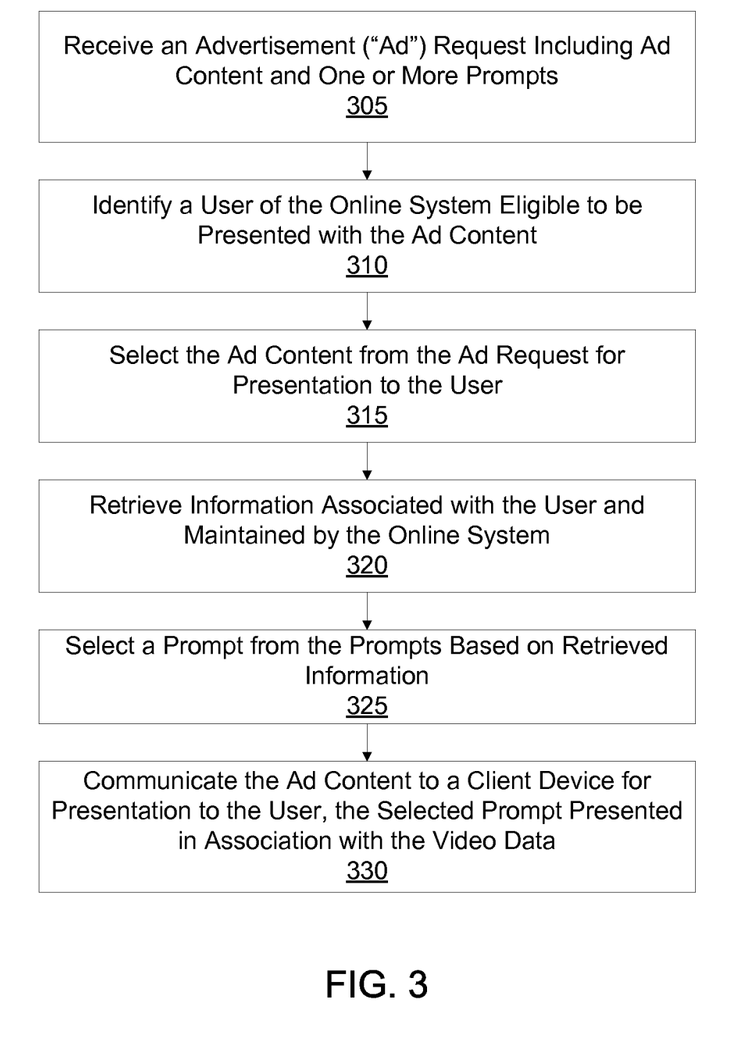
FIG. 3 is a flowchart of a method for selecting a prompt for performing an action to present in association with advertisement content, in accordance with an embodiment.

Selecting a Prompt for Performing an Action to Present in Association with Ad Content FIG. 3 is a flowchart of one embodiment of a method for selecting a prompt for performing an action to present in association with video data. In the embodiment described in conjunction with FIG. 3, video data is included in advertisement ("ad") content of an advertisement ("ad") request. However, in other embodiments, the video content may be included in a content item presented in conjunction with ad content from an advertisement request (e.g., video data from a content item provided to the online system 140 by a user). In other embodiments, the method may include different and/or additional steps than those shown in FIG. 3. Additionally, steps of the method may be performed in different orders than the order described in conjunction with FIG. 3.

The online system 140 receives 305 an advertisement ("ad") request including ad content, targeting criteria, and one or more prompts for performing actions from an advertiser. In various embodiments, the ad content includes video data. A prompt for performing an action includes information identifying an action and instructions that, when executed, perform the identified action. For example, a prompt for performing an action, also known as a "call to action," is associated with a network address and an instruction to retrieve content from the network address if an input selecting the prompt is received. Example prompts include "learn more," "play more," "purchase," "buy," "browse more," "see more," "visit site," "see similar products," and any other suitable prompt allowing a user to access additional information associated with the ad content. Examples of instructions associated with a prompt include: instructions to present content from a third party system 130 associated with an identified product or service, instructions to present content from a third party system 130 for purchasing a product or service, instructions to retrieve content from a third party system 130 to retrieve information associated with additional products or services, instructions to perform one or more actions with an object maintained by the online system 140 and identified by the instructions (e.g., indicate a preference for a page associated with a product or service in the ad content, access a page associated with a product or service in the ad content), and instructions to download an application associated with the ad content.

In some embodiments, one or more of the prompts in the ad request are defined by the advertiser. For example, the advertiser specifies the text of the prompt and provides instructions to execute an action associated with the prompt. The advertiser may also select from one or more previously defined prompts, which may be previously-presented text and associated instructions or may be selected from pre-defined associations between text and instructions. In some embodiments, the advertiser associates one or more prompts in the ad request with a specific frame or group of frames of the video data of the ad content. Alternatively, an advertiser may associate a prompt with an object (e.g., a product) included in video data and identify one or more frames in relation to the object for presenting the prompt. In various embodiments, the online system 140 applies one or more image recognition algorithms, computer vision algorithms, or any other suitable object detection algorithm to the video data to identify one or more objects in the video data and one or more frames in which an object is presented. Optical character recognition (OCR) algorithms or any other suitable text recognition algorithm may also be used to identify text in the video data, which may be associated with one or more prompts by an advertiser to specify one or more frames of the video data in which a prompt is presented. Hence, an advertiser may associate one or more prompts with objects or text to present a prompt in one or more frames of the video data including, or relative to a frame including, an object or text data.

Based on the targeting criteria included in the ad request and characteristics associated with online system users, the online system 140 identifies 310 a user of the online system 140 eligible to be presented with the ad content. For example, a user associated with at least a threshold number of characteristics satisfying the targeting criteria in the ad request is identified as eligible to be presented with the ad content from the ad request. Example characteristics included in targeting criteria are described above in conjunction with FIG. 2.

If the video data is included in a content item associated with a user of the online system 140, the one or more prompts are associated with one or more frames of the video data. Thus, the online system 140 may receive an ad request from an advertiser to present one or more prompts in conjunction with one or more frames of the video data, allowing the advertiser to present advertisement content, in the form of the prompts, in conjunction with video data from a content item. The ad request may identify the content item or may identify characteristics of content items and include a bid amount for presenting the one or more prompts in conjunction with the one or more frames. In some embodiments, the ad request may identify a representation of a product or a description of a product for presentation along with one or more prompts in conjunction with frames of the video data. A user viewing the video data may then interact with the representation of a product or a prompt displayed in conjunction with one or more frames of the video data. As described above, image recognition algorithms, computer vision algorithms or any other suitable object detection algorithm may be applied to the video data to identify an object in the video data so a prompt is presented relative to a frame including an object specified by the ad request. If the ad request identifies text data, optical character recognition (OCR) algorithms or any other suitable text recognition algorithm may be applied to the video data to identify the text data so a prompt is presented in one or more frames determined based on a frame including text data specified by the ad request.

The online system 140 selects 315 the ad content from the ad request for presentation to the user. As described above in conjunction with FIG. 2, when selecting 315 content for presentation to the identified user, the ad request is included in a selection process in which one or more content items, which may include ad requests, are selected 315 for presentation to the identified user. In various embodiments, the bid amount included in the ad request is used in the selection process when determining whether to present the ad content included in the ad request to the identified user. For example, the online system 140 determines an expected value associated with the ad request based on its bid amount and a likelihood of the identified user interacting with the ad content. If the ad request is associated with at least a threshold expected value or has at least a threshold expected value, it is selected 315 for presentation. As another example, the online system 140 ranks ad requests based on their associated expected values, and if the ad request has at least a threshold position in the ranking, it is selected 315 for presentation.

Information associated with the user and maintained by the online system 140 is retrieved 320 if the ad request is selected 315 for presentation to the user. The retrieved information includes demographic information associated with the user, actions performed by the user and stored by the online system 140, additional users connected to the user via the online system 140, content items (including ad requests) previously presented to the user via the online system 140, and a location associated with the user. As described above in conjunction with FIG. 2, the retrieved information may be obtained from one or more of the user profile store 205, the action log 220, and the edge store 225.

In one embodiment, the retrieved information includes one or more flags where a flag indicates a user associated with the flag previously viewed a specific ad request or viewed ad content from a specific ad request. A flag may identify an ad request viewed by a user and may be included in the user profile associated with the user and stored in the user profile store 205. In certain embodiments, an advertiser specifies a sequence of ad requests including ad content for presentation in an order based on the sequence. If the user is associated with a flag indicating the user has viewed ad content from an ad request in the sequence, the online system 140 identifies that the user is eligible to be presented with ad content from an additional ad request having a later position in the sequence. Each ad request in the sequence of ad requests is associated with a unique flag that is associated with the user after the user is presented with ad content from an ad request. Flags associated with the user may be used to identify ad requests eligible for presentation to the user. If a flag indicates the user has been presented with ad content from an ad request in a sequence of ad requests, the online system 140 determines the user is eligible to be presented with ad content from an additional ad request having a later position in the sequence than the ad request.

Based at least in part on the retrieved information associated with the user, the online system 140 selects 325 a prompt for performing an action from the one or more prompts included in the ad request. For example, the online system 140 identifies a set of prompts for performing actions from the one or more prompts for performing actions included in the ad request and determines a relevance score between each prompt in the set and the user based on the retrieved information associated with the user. In one embodiment, the relevance score between a prompt and the user is based on a number of actions associated with the user matching or similar to the action associated with the prompt, so prompts associated with an action that the user has more frequently performed have higher relevance scores.

Relevance scores may also be based on one or more flags associated with the user. As described above, a flag is information indicating whether ad content associated with an ad request has been presented to the user. If a flag indicates that an ad request from a sequence including the ad request was previously presented to the user, relevance scores for various prompts included in the ad request matching or similar to prompts presented along with ad content from the previously presented ad request are decreased. Similarly, relevance scores for other prompts in the ad request differing from prompts presented with ad content from the previously presented ad request may be increased to increase the likelihood of the user being presented with different prompts with the ad content from the ad request than presented with the ad content from the previously presented ad request in the sequence.

Additional information associated with the user, as well as characteristics associated with the video data included in the ad request may also be used when determining relevance scores. For example, topics associated with the video data are compared to interests associated with the user, and actions performed by the user and associated with interests matching a topic associated with the video are compared to actions associated with prompts to perform actions in the ad request to determine relevance scores. When determining the relevance score associated with a prompt, actions associated with the user and matching an action associated with the prompt may be more heavily weighted if the actions associated with the user are associated with an object having one or more topics matching a topic associated with the video data.

In some embodiments, different characteristics are associated with different portions of the video data, and different prompts for performing actions are selected 325 for presentation with different portions of the video data based on characteristics associated with portions of the video data and the retrieved information associated with the user. For example, the advertiser from which the ad request was received 305 identifies characteristics associated with various portions of the video data in the ad content. The portions of the video data may be frames of the video data or time intervals of the video data. Characteristics associated with a portion of the video data may be specified by the advertiser providing the ad request to the online system 140. Example characteristics of a portion of the video data include: context of a frame, color data of a frame, volume of audio associated with a frame, pitch of audio associated with a frame, or any other suitable information associated with a portion of the video data. Example characteristics of context of a frame include: an identification of a subject presented in the frame, a feature of a subject presented in the frame, an action executed in the frame, an identification of audio playing in the frame. Color data of a frame includes information identifying a color scheme of the frame, information identifying a dominant color of the frame, and information identifying a filter associated with the frame. In one embodiment, a selected prompt is presented when a portion of the video data including a characteristic is presented or the selected prompt is presented after a portion of the video data including a characteristic is presented.

Based at least in part on the relevance scores, the online system 140 selects 325 one or more prompts for performing an action. In one embodiment, the online system 140 selects 325 a prompt having a maximum relevance score or selects 325 one or more prompts having at least a threshold relevance score. Alternatively, the online system 140 ranks the prompts based on their associated relevance scores and selects 325 one or more prompts based on the ranking. For example, the online system 140 selects 325 one or more prompts having at least a threshold position in the ranking or selects a prompt having a highest position in the ranking. Alternatively, an advertiser selects 325 one or more prompts and sends the selection to the online system 140; the advertiser may select the one or more prompts when the ad request is sent from the advertiser to the online system 140.

The online system 140 communicates 330 the ad content to a client device 110 along with information identifying the one or more selected prompts, so the one or more selected prompts for performing actions are presented in association with the video data included in the ad content. In one embodiment, a selected prompt for performing an action is presented after the video data included in the ad content has been presented. Alternatively, the selected prompt for performing an action is presented after a portion of the video data has been presented. For example, the selected prompt is presented after a portion of the video data associated with a specific characteristic associated with the prompt has been presented. Further, different selected prompts for performing actions may be presented after different portions of the video data associated with different characteristics have been presented. The selected prompt may be inserted or overlaid within one or more frames in the video data, such as specific frames or frames including an object specified by the ad request. When a prompt is inserted into a frame, a portion of the frame is used to present the prompt or content associated with the prompt.

Presenting a Prompt for Performing an Action in Ad Content

Figure 4A:
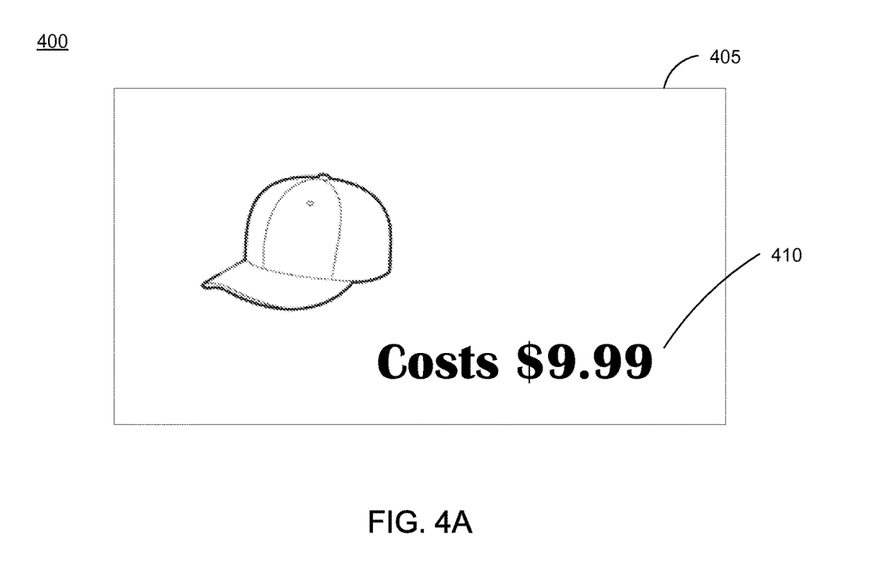
FIGS. 4A and 4B illustrate examples of presenting a prompt for performing an action in ad content on an online system, in accordance with an embodiment.
Figure 4B:
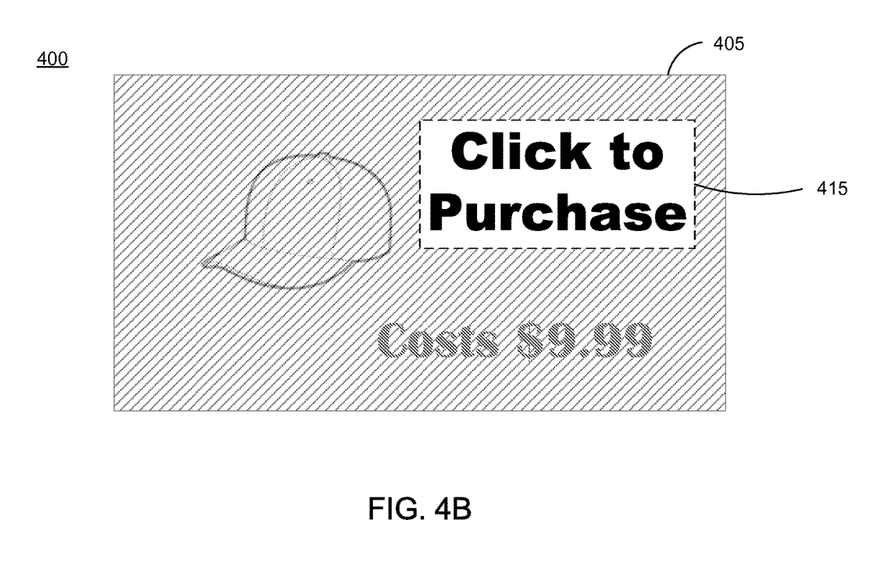

FIGS. 4A and 4B are examples of presenting a prompt for performing an action in ad content presented via the online system 140. FIG. 4A illustrates a frame 405 of video data 400 presented in ad content. The frame 405 may be a final frame of the video data 400 or may be a frame 405 included in a portion of the video data 400. As described above in conjunction with FIG. 3, the frame 405 may be associated with one or more characteristics 410. In the example of FIG. 4A, the frame 405 is associated with a characteristic 410 identifying a price associated with content of the video data 400, such as a price of a hat presented in the video data 400.

In FIG. 4B, a prompt 415 for performing an action selected by the online system 140 as described above in conjunction with FIG. 3 is presented after the video data 400 is presented. For example, the online system 140 selected the prompt 415 based on information associated with a user to which the video data 400 was presented. In the example of FIG. 4B, the user has a history of purchasing many products identified via the online system 140, so the selected prompt 415 identifies an action for the user to purchase a product or service associated with content of the video data 400. The prompt 415 may be presented in conjunction with the frame 405, may be presented after the frame 405, or may be presented after the video data 400 has been presented in its entirety.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving, at a server of an online system, a first advertisement and a second related advertisement from an advertiser organized in a sequence where the first advertisement precedes the second related advertisement, wherein each of the first and the second related advertisements includes different advertisement video data, a set of objects included in the advertisement video data, targeting criteria, and a set of prompts for performing a set of actions, each of the set of prompts comprising text data describing one of the set of actions and a network address for performing an action associated with the text data;

identifying, at the server of the online system, a user of the online system eligible to be presented with the first advertisement, the user associated with at least a threshold number of characteristics satisfying the targeting criteria included with the first advertisement;

selecting, by the server of the online system, a first prompt for performing an action from the set of prompts for performing actions of the first advertisement, wherein each prompt of the set of prompts corresponds to a different object in the set of objects, and the first prompt is selected for the user based on a relevance score between the characteristics of the user and the object in the set of objects corresponding to the first prompt;

identifying, by the server of the online system, a set of frames within the advertisement video data of the first advertisement that include the object that corresponds to the selected prompt by applying an object recognition algorithm to the advertisement video data of the first advertisement;

sending, by the server of the online system, the advertisement video data of the first advertisement to a client device of the identified user for display on a user interface of the client device, wherein the selected prompt is overlaid upon the identified set of frames that include the object such that a portion of each frame in the identified set of frames presents the prompt;

determining, by the server of the online system, that the user is eligible to be presented with an additional advertisement;

determining, by the server of the online system, that the user has been presented the advertisement video data of the first advertisement;

determining, by the server of the online system, that the user shall be presented advertisement video data of the second related advertisement, based on the received sequence and the determination that the user has been presented the advertisement video data of the first advertisement;

selecting, by the server of the online system, a second prompt for performing an action from the set of prompts for performing actions of the second related advertisement, wherein the second prompt is different from the first prompt; and sending, by the server of the online system, the advertisement video data of the second related advertisement to the client device for display on the user interface, wherein the selected second prompt is overlaid upon the advertisement video data of the second related advertisement.

2. The method of claim 1, further comprising:

storing information associated with the identified user indicating that the advertisement video data associated with the advertisement was presented to the user, the information indicating that the user is eligible to be presented with advertisement video data from an additional advertisement from the set of advertisements, the additional advertisement having a later position in the sequence than the advertisement.

3. The method of claim 1, wherein the selected prompt for performing the action is presented to the user after a portion of the advertisement video data is presented.

4. The method of claim 1, wherein selecting the prompt for performing the action based at least in part on the determined relevance scores comprises: selecting a prompt for performing the action having a maximum relevance score.

5. The method of claim 1, wherein selecting the prompt for performing the action based at least in part on the determined relevance scores comprises:

ranking the set of prompts for performing actions based at least in part on the determined relevance scores; and selecting a prompt for performing an action having at least a threshold position in the ranking.

6. The method of claim 1, wherein determining the relevance score for each prompt from the set of prompts comprises:

retrieving characteristics of the advertisement video data included in the advertisement; and determining the relevance score for each prompt from the set of prompts based at least in part on the characteristics of the user and the retrieved characteristics of the advertisement video data.

7. A non-transitory, computer program product comprising a computer-readable storage medium having instructions encoded thereon that, when executed by a processor, cause the processor to:
receive, at a server of an online system, a first advertisement and a second related advertisement from an advertiser organized in a sequence where the first advertisement precedes the second related advertisement, wherein each of the first and second related advertisements includes different advertisement video data, a set of objects included in the advertisement video data, targeting criteria, and a set of prompts for performing a set of actions, each of the set of prompts comprising text data describing one of the set of actions and a network address for performing an action associated with the text data;
identify, at the server of the online system, a user of the online system eligible to be presented with the first advertisement, the user associated with at least a threshold number of characteristics satisfying the targeting criteria included with the first advertisement;
select, by the server of the online system, a first prompt for performing an action from the set of prompts for performing actions of the first advertisement, wherein each prompt of the set of prompts corresponds to a different object in the set of objects, and the first prompt is selected for the user based on a relevance score between the characteristics of the user and the object in the set of objects corresponding to the first prompt;
identify, by the server of the online system, a set of frames within the advertisement video data of the first advertisement that include the object that corresponds to the selected prompt by applying an object recognition algorithm to the advertisement video data of the first advertisement;
send, by the server of the online system, the advertisement video data of the first advertisement to a client device of the identified user for display on a user interface of the client device, wherein the selected prompt is overlaid upon the identified set of frames that include the object such that a portion of each frame in the identified set of frames presents the prompt;
determine, by the server of the online system, that the user is eligible to be presented with an additional advertisement;
determine, by the server of the online system, that the user has been presented the advertisement video data of the first advertisement;
determine, by the server of the online system, that the user shall be presented advertisement video data of the second related advertisement, based on the received sequence and the determination that the user has been presented the advertisement video data of the first advertisement;
select, by the server of the online system, a second prompt for performing an action from the set of prompts for performing actions of the second related advertisement, wherein the second prompt is different from the first prompt; and
send, by the server of the online system, the advertisement video data of the second related advertisement to the client device for display on the user interface, wherein the selected second prompt is overlaid upon the advertisement video data of the second related advertisement.

8. The computer program product of claim 7, wherein the computer-readable storage medium further has instructions encoded thereon that, when executed by the processor, cause the processor to:
store information associated with the identified user indicating that the advertisement video data associated with the advertisement was presented to the user, the information indicating that the user is eligible to be presented with advertisement video data from an additional advertisement from the set of advertisements, the additional advertisement having a later position in the sequence than the advertisement.

9. The computer program product of claim 7, wherein the selected prompt for performing the action is presented to the user after a portion of the advertisement video data is presented.

10. The computer program product of claim 7, wherein select the prompt for performing the action based at least in part on the determined relevance scores comprises:
select a prompt for performing the action having a maximum relevance score.

11. The computer program product of claim 7, wherein select the prompt for performing the action based at least in part on the determined relevance scores comprises:
rank the set of prompts for performing actions based at least in part on the determined relevance scores; and
select a prompt for performing an action having at least a threshold position in the ranking.

12. The computer program product of claim 7, wherein determine the relevance score for each prompt from the set of prompts comprises:
retrieve characteristics of the advertisement video data included in the advertisement; and
determine the relevance score for each prompt from the set of prompts based at least in part on the characteristics of the user and the retrieved characteristics of the advertisement video data.

13. The method of claim 1, further comprising:
identifying, at the server of the online system, a second user of the online system eligible to be presented with the advertisement;
selecting, by the server of the online system, a second prompt for performing an action from the set of prompts for performing actions, wherein the second prompt is selected for the second user based on a second relevance score between the characteristics of the second user and a second object in the set of objects corresponding to the second prompt, wherein the second object is different from the object in the set of objects corresponding to the prompt;
identifying, by the server of the online system, a second set of frames within the advertisement video data that include the second object that corresponds to the selected second prompt by applying an object recognition algorithm to the advertisement video data; and
sending, by the server of the online system, the advertisement video data to a second client device of the identified second user for display on a user interface of the second client device, wherein the selected second prompt is overlaid upon the identified second set of frames that include the second object such that a portion of each frame in the identified second set of frames presents the second prompt.

14. The non-transitory computer program product of claim 7, further comprising:
   identify, at the server of the online system, a second user of the online system eligible to be presented with the advertisement;
   select, by the server of the online system, a second prompt for performing an action from the set of prompts for performing actions, wherein the second prompt is selected for the second user based on a second relevance score between the characteristics of the second user and a second object in the set of objects corresponding to the second prompt, wherein the second object is different from the object in the set of objects corresponding to the prompt;
   identify, by the server of the online system, a second set of frames within the advertisement video data that include the second object that corresponds to the selected second prompt by applying an object recognition algorithm to the advertisement video data; and
   send, by the server of the online system, the advertisement video data to a second client device of the identified second user for display on a user interface of the second client device, wherein the selected second prompt is overlaid upon the identified second set of frames that include the second object such that a portion of each frame in the identified second set of frames presents the second prompt.

15. A system, comprising:
   a processor for executing computer program instructions; and
   a non-transitory computer-readable storage medium storing computer program instructions executable by the processor to perform operations comprising:
   receiving, at a server of an online system, a first advertisement and a second related advertisement from an advertiser organized in a sequence where the first advertisement precedes the second related advertisement, wherein each of the first and second related advertisements includes different advertisement video data, a set of objects included in the advertisement video data, targeting criteria, and a set of prompts for performing a set of actions, each of the set of prompts comprising text data describing one of the set of actions and a network address for performing an action associated with the text data;
   identifying, at the server of the online system, a user of the online system eligible to be presented with the first advertisement, the user associated with at least a threshold number of characteristics satisfying the targeting criteria included with the first advertisement;
   selecting, by the server of the online system, a first prompt for performing an action from the set of prompts for performing actions of the first advertisement, wherein each prompt of the set of prompts corresponds to a different object in the set of objects, and the first prompt is selected for the user based on a relevance score between the characteristics of the user and the object in the set of objects corresponding to the first prompt;
   identifying, by the server of the online system, a set of frames within the advertisement video data of the first advertisement that include the object that corresponds to the selected prompt by applying an object recognition algorithm to the advertisement video data of the first advertisement;
   sending, by the server of the online system, the advertisement video data of the first advertisement to a client device of the identified user for display on a user interface of the client device, wherein the selected prompt is overlaid upon the identified set of frames that include the object such that a portion of each frame in the identified set of frames presents the prompt;
   determining, by the server of the online system, that the user is eligible to be presented with an additional advertisement;
   determining, by the server of the online system, that the user has been presented the advertisement video data of the first advertisement;
   determining, by the server of the online system, that the user shall be presented advertisement video data of the second related advertisement, based on the received sequence and the determination that the user has been presented the advertisement video data of the first advertisement;
   selecting, by the server of the online system, a second prompt for performing an action from the set of prompts for performing actions of the second related advertisement, wherein the second prompt is different from the first prompt; and
   sending, by the server of the online system, the advertisement video data of the second related advertisement to the client device for display on the user interface, wherein the selected second prompt is overlaid upon the advertisement video data of the second related advertisement.

16. The system of claim 15, the operations further comprising:
   identifying, at the server of the online system, a second user of the online system eligible to be presented with the advertisement;
   selecting, by the server of the online system, a second prompt for performing an action from the set of prompts for performing actions, wherein the second prompt is selected for the second user based on a second relevance score between the characteristics of the second user and a second object in the set of objects corresponding to the second prompt, wherein the second object is different from the object in the set of objects corresponding to the prompt;
   identifying, by the server of the online system, a second set of frames within the advertisement video data that include the second object that corresponds to the selected second prompt by applying an object recognition algorithm to the advertisement video data; and
   sending, by the server of the online system, the advertisement video data to a second client device of the identified second user for display on a user interface of the second client device, wherein the selected second prompt is overlaid upon the identified second set of frames that include the second object such that a portion of each frame in the identified second set of frames presents the second prompt.

* * * * *